(12) United States Patent
Kato

(10) Patent No.: US 9,154,643 B2
(45) Date of Patent: *Oct. 6, 2015

(54) IMAGE FORMING APPARATUS AND IMAGE PROCESSING METHOD

(71) Applicants:KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Kato, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,321

(22) Filed: May 13, 2014

(65) Prior Publication Data

US 2014/0247467 A1    Sep. 4, 2014

Related U.S. Application Data

(63) Continuation of application No. 13/693,251, filed on Dec. 4, 2012, now Pat. No. 8,760,681.

(60) Provisional application No. 61/577,190, filed on Dec. 19, 2011.

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *G06F 3/14* | (2006.01) |

(52) U.S. Cl.
CPC .............. *H04N 1/00204* (2013.01); *G06F 3/14* (2013.01); *H04N 1/00307* (2013.01); *H04N 1/00408* (2013.01); *H04N 1/00482* (2013.01); *H04N 2201/001* (2013.01); *H04N 2201/0013* (2013.01); *H04N 2201/0094* (2013.01)

(58) Field of Classification Search
CPC .......... H04N 1/00204; H04N 1/00482; H04N 1/00307; H04N 1/00408; H04N 2201/001; H04N 2201/0013; H04N 2201/0094; G06F 3/14
USPC ................................. 358/1.15, 1.13, 1.14, 1.1
See application file for complete search history.

(56) References Cited

U.S. PATENT DOCUMENTS

2010/0215232 A1  8/2010  Woo
2010/0315316 A1  12/2010  Mihara et al.

FOREIGN PATENT DOCUMENTS

JP    2011-238006    11/2011

*Primary Examiner* — Douglas Tran
(74) *Attorney, Agent, or Firm* — Amin, Turocy & Watson, LLP

(57) ABSTRACT

According to one embodiment, an image forming apparatus which communicates with a first terminal device includes a first display unit which displays display data, a storage unit which stores first ability information relating to a display ability of the first display unit, an operation panel management unit which is provided at the first terminal device, obtains second ability information relating to a display ability of a second display unit which displays display data, and compares the obtained second ability information to the first ability information which is stored in the storage unit; and a control unit which determines whether to display display data as a display target on the first display unit, or on the second display unit.

16 Claims, 12 Drawing Sheets

FIG. 5

| OPERATION PANEL IDENTIFI-CATION ID | DISPLAY RESOLUTION | OPERATION DETECTION METHOD | RELATIVE POSITION TO IMAGE FORMING APPARATUS (X,Y,Z COORDINATE)(MM) | PRESENCE OR ABSENCE OF INCLINATION SENSOR |
|---|---|---|---|---|
| 00001 | 800 x 600dpi | RESISTANCE FILM TYPE | 0,0,0 | NOT PRESENT |
| 00002 | 1024 x 768dpi | CAPACITIVE TYPE | 800,100,100 | PRESENT |
| 00003 | 800 x 400dpi | RESISTANCE FILM TYPE | -50,50,400 | NOT PRESENT |

FIG. 6

| IDENTIFICATION ID | DISPLAY RESOLUTION (a) | OPERATION DETECTION METHOD (b) | RELATIVE POSITION TO IMAGE FORMING APPARATUS (X,Y,Z COORDINATE) (c) | PRESENCE OR ABSENCE OF INCLINATION SENSOR (d) | TOTAL RATING (WEIGHTING) =3a+2b+c+d |
|---|---|---|---|---|---|
| 00001 | 800 x 600dpi RATING:2 | RESISTANCE FILM TYPE RATING:2 | 0,0,0 RATING:1 | NOT PRESENT RATING:2 | 13 |
| 00002 | 1024 x 768dpi RATING:1 | CAPACITIVE TYPE RATING:1 | 800,100,100 RATING:3 | PRESENT RATING:1 | 9 |
| 00003 | 800 x 400dpi RATING:3 | RESISTANCE FILM TYPE RATING:2 | -50,50,400 RATING:2 | NOT PRESENT RATING:2 | 17 |

IMAGE FORMING APPARATUS AND IMAGE PROCESSING METHOD

CROSS-REFERENCE TO RELATED APPLICATIONS

This application is a Continuation of application Ser. No. 13/693,251 filed Dec. 4, 2012, which is based upon and claims the benefit of priority from: U.S. provisional application 61/577,190, filed on Dec. 19, 2011; the entire contents of all of which are incorporated herein by reference.

FIELD

Embodiments described herein relate generally to a technology in which display performance of displaying image data on a plurality of display units is improved.

BACKGROUND

In the related art, when one image is displayed on a large screen, there is a multi-display function in which one image is divided, and is displayed on a plurality of displays. The multi-display function can be executed in an information terminal device in which, for example, Windows (registered trade mark) operating system is installed. Specifically, Windows (registered trade mark) displays divided images that are the divided single target image to be displayed, on the respective display units of a plurality of connected information terminal devices.

However, such a multi-display function of Windows (registered trade mark) could only be performed between Windows and an information terminal device.

DESCRIPTION OF THE DRAWINGS

FIG. 5 is a diagram which illustrates ability information of a plurality of display units which are managed by an operation panel management unit.

FIG. 6 is a diagram which illustrates total rating of the image forming apparatus, and the terminal device which is performing the synchronizing communication.

DETAILED DESCRIPTION

An image forming apparatus according to the embodiment is an image forming apparatus which communicates with a first terminal device, and the apparatus includes a first display unit which displays display data; a storage unit which stores first ability information relating to a display ability of the first display unit; an operation panel management unit which is provided at the first terminal device, obtains second ability information relating to a display ability of a second display unit which displays display data, and compares the obtained second ability information to the first ability information which is stored in the storage unit; and a control unit which determines whether to display display data as a display target on the first display unit, or on the second display unit according to a comparison result of the ability information which is obtained by the operation panel management unit.

Figure 1:
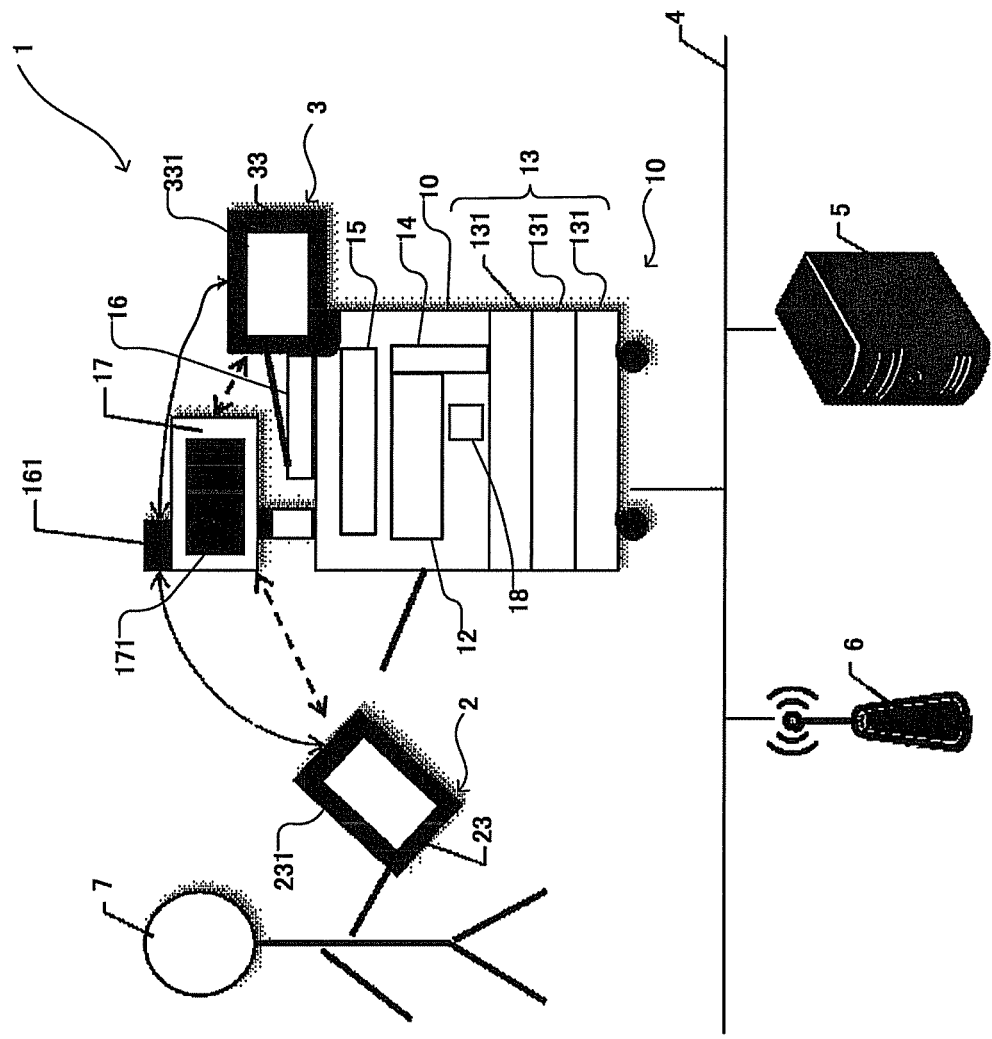
FIG. 1 is a diagram which illustrates an image processing system.

Hereinafter, the image processing system 1 according to an embodiment will be described with reference to drawings. FIG. 1 is a diagram which illustrates an image processing system 1, and FIG. 2 is a diagram which illustrates an image forming apparatus 10.

As illustrated in FIG. 1, the image processing system 1 according to the embodiment includes the image forming apparatus 10, a first terminal device 2, a second terminal device 3, a network 4, a server 5, and a wireless LAN access point 6.

Figure 2:
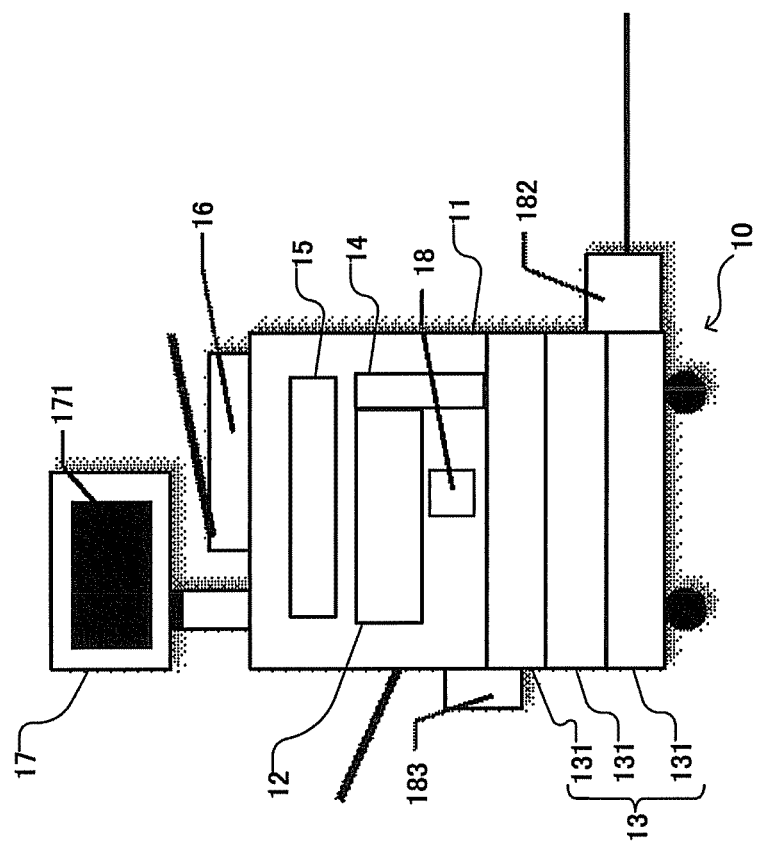
FIG. 2 is a diagram which illustrates an image forming apparatus.

In FIG. 2, a multi-function peripheral (MFP) 10 as the image forming apparatus 10 includes a color image forming unit 12, a paper feeding unit 13 having a plurality of paper feeding cassettes 131, a sheet transporting unit 14 which transports sheets in the paper feeding cassettes 131 to the image forming unit 12, an image reading unit 15, an automatic document feeding unit 16, a first operation panel 17, and a first control unit (control unit) 18 in a main body 11 of the image forming apparatus.

The image forming unit 12 performs a process of printing print data on a sheet. The image reading unit 15 performs reading of the image data which is printed on the sheet, and sends the read image data to the first storage unit (storage unit) 19.

The first operation panel 17 is configured by a first display unit 171 and a first operation unit 172. The first display unit 171 is a touch panel of a resistance film type (resistive) having a predetermined display resolution, and displays an image which is transmitted from a first control unit 18 to be described later, and a print setting screen of the image forming apparatus 10. The touch panel of resistance film type is formed by superimposing ITO (Indium Tin Oxide) glass, and an ITO thin film, the ITO glass and the ITO thin film are electrically connected by being in contact along with a touch operation of a user 7, and a touch point of the user 7 is detected. The touch panel of resistance film type is able to detect a single touch operation in which touching is performed by one finger of the user 7. The first operation unit 172 includes a ten key, a stop key, a start key, or the like, and receives inputs of a print mode (print processing), and an image reading mode (image reading processing) from the user 7.

The first control unit 18 is a CPU, and controls the entire image forming apparatus 10. The control unit transmits the image data as the display target to the first terminal device 2, or the second terminal device 3 based on a determination result of an operation panel management unit 181 to be described later (according to comparison result of ability information by operation panel management unit 181), and displays an image corresponding to the print setting screen, or the image data of the image forming apparatus 10, on the first display unit 171.

The first terminal device 2 includes a second display unit 231 which displays image data, and communicates with the image forming apparatus 10. As the terminal device, for example, there are a notebook personal computer, a tablet-type personal computer, a mobile phone, a PHS, a smart phone, a smart book, a slate-type terminal, and the like.

The second display unit 231 is a capacitive touch panel having a predetermined display resolution, or the touch panel of resistance film type, and displays image data which is transmitted from the first control unit 18. The capacitive touch panel is a panel in which each potential on the touch panel becomes similar before the user 7 touches the panel, however, when the user 7 touches the panel, a feeble current is generated between a human body and the touch panel, an electric capacitance field is formed, and a touch point is detected. For this reason, in the capacitive touch panel, not only the single touch operation, but also a multiple touch operation in which the user 7 touches the touch panel using a plurality of fingers can be detected. Specifically, it is possible to detect both a pinch out movement and a pinch in movement of the user 7 on the touch panel. In addition, the pinch out movement is a movement in which the user 7 comes into contact with the touch panel thereon using two fingers or the like simultaneously, and open the two fingers as are, and the pinch in movement is a movement in which the user 7 comes into contact with the touch panel thereon using two fingers or the like simultaneously, and closes the two fingers as are.

The second terminal device 3 includes a third display unit 331 which displays image data, and communicated with the image forming apparatus 10. Since the second terminal device 3 has the same configuration as that of the first terminal device 2, descriptions thereof will be omitted.

Figure 3:
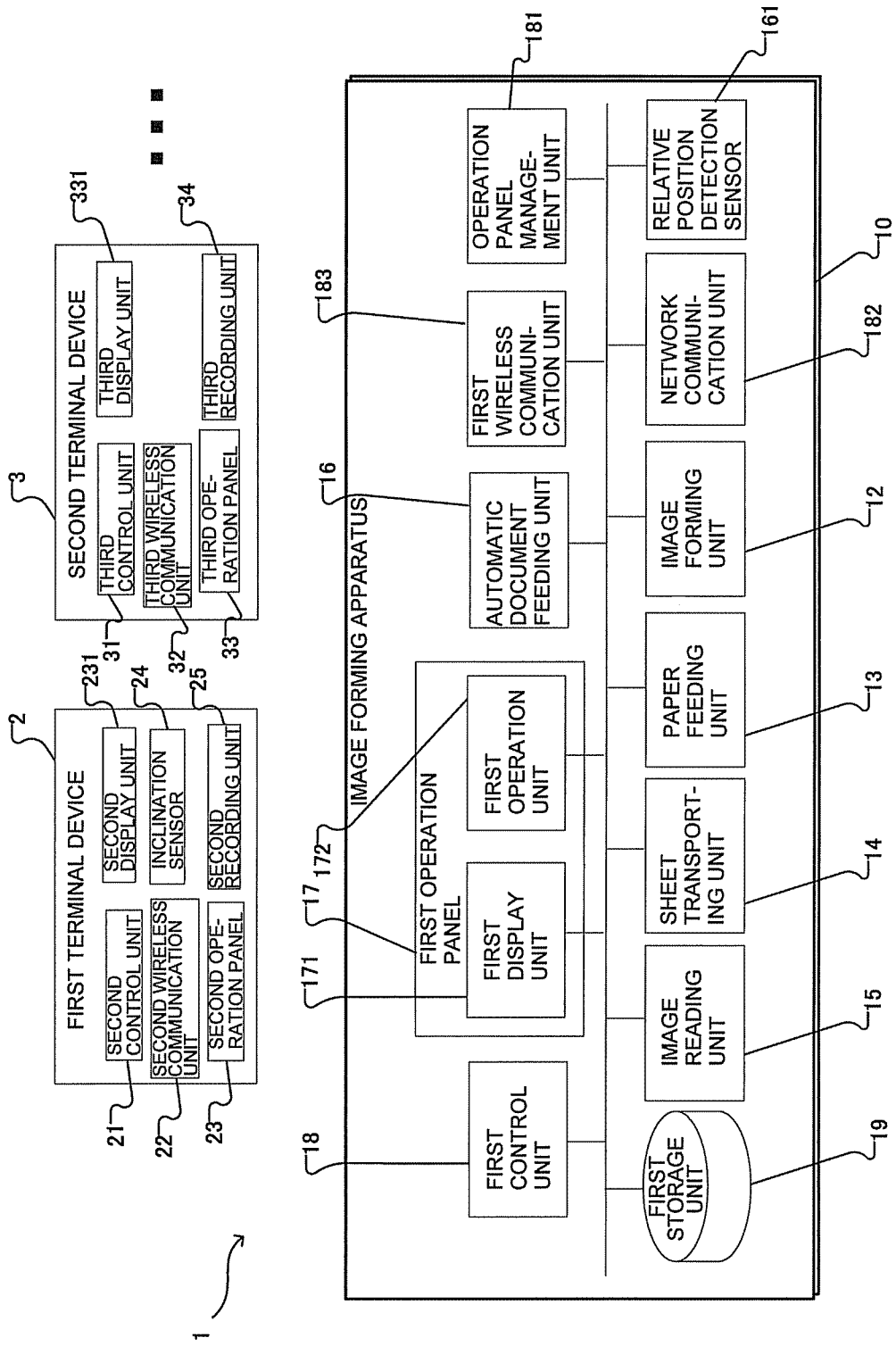
FIG. 3 is a block diagram which illustrates a hardware configuration of the image processing system.

Subsequently, a hardware configuration of the image processing system 1 will be described. FIG. 3 is a block diagram which illustrates hardware of the image processing system 1.

As illustrated in FIG. 3, the image forming apparatus 10 includes a first storage unit 19, the first control unit 18, an operation panel 17, the sheet transporting unit 14, the image forming unit 12, the image reading unit 15, the automatic document feeding unit 16, the paper feeding unit 13, a network communication unit 182, a first wireless communication unit 183, the operation panel management unit 181, and a relative position detection sensor 161.

The first storage unit 19 is connected to the image reading unit 15, the network communication unit 182, and the first wireless communication unit 183, is a memory, an HDD (Hard Disk Drive), or the like. The first storage unit 19 stores image data which is read out from the image reading unit 15, print data which is transmitted to the image forming unit 12 through the network communication unit 182, or the wireless communication unit, an identification number of the image forming apparatus 10 itself, identification numbers of all of terminal devices which can communicate with the image forming apparatus 10, a first display ability, and the like. In addition, the first display ability includes information on a display resolution, and an operation detection method (resistance film type of first display unit 171) of the first display unit 171, a position of the terminal device with respect to the image forming apparatus 10 (relative position with image forming apparatus 10), and an absence of an inclination sensor 24 to be described later.

The network communication unit 182 performs a communication through a wired network, and is connected to the server 5. The first wireless communication unit 183 performs a communication using, for example, a wireless network which is conformed with IEEE802.11 standard (WiFi network, or WLAN), a wireless communication network which is conformed with IEEE802.16 standard (for example, Wimax 802.16e, or Wibro) through the wireless LAN access point 6.

The operation panel management unit 181 obtains second ability information relating to a display ability of the second display unit 231, and third ability information relating to a display ability of the third display unit 331, and compares the obtained second ability information, and the third ability information to the first ability information which is stored in the first storage unit 19. Specifically, the operation panel management unit 181 obtains information on the display resolution and the operation detection method in the second display unit 231, and the third display unit 331, the presence or absence of the inclination sensor 24 in the first terminal device 2 and the second terminal device 3, and the relative position of the image forming apparatus 10 as the second ability information, and the third ability information. The operation panel management unit 181 compares the obtained second ability information, and third ability information to the first ability information which is stored in the first storage unit 19, and sequentially gives a rating to each item in the first, second, and third ability information. The operation panel management unit 181 multiplies the rating relating to the display resolution, the operation detection method, the presence or absence of the inclination sensor 24, and the relative position to the image forming apparatus 10 by a weighting factor, and calculates total rating relating to first ability information, second ability information, and third ability information. In addition, the operation panel management unit 181 determines ranking of the image forming apparatus 10, the first terminal device 2, and the second terminal device 3 based on the calculated total rating, and transmits the determination result (comparison result) to the first control unit 18.

Here, the weighting factor can be arbitrarily set depending on an intention of the user 7. For example, when the user 7 wants to give weight in order of a visibility of an image, and an operability, each weighting factor by which the display resolution, the operation detection method, the relative position to the image forming apparatus 10, and the presence or absence of the inclination sensor 24 are multiplied is set to 3:2:1:1. Due to this, the operation panel management unit 181 calculates high rating with respect to a display unit of which the display resolution, and the operation detection method are the best, and determines the ranking of the display unit of which the display resolution, and the operation detection method are excellent. By adopting such a configuration, it is possible to display target image data on a display unit which is desired by the user 7.

In addition, which display unit among the first display unit 171, the second display unit 231, and the third display unit 331 will be caused to display the print setting screen of the image forming apparatus 10, or display an image corresponding to image data as the display target is determined based on the result (comparison result) which is determined by the operation panel management unit 181. Specifically, the operation panel management unit 181 performs a display allocation so that a display unit with the lowest ranking (display unit of which display ability is determined as the lowest) is caused to display a print setting screen in which high display resolution is not necessary (transmitting print setting screen data), and other display units that are caused to display images (transmitting image data) corresponding to image data as the display target.

In addition, the operation panel management unit 181 generates divided images which are divided depending on the number of display units which display image data when image data as the display target is displayed on two or more display units. For example, when the image as the display target is displayed on two display units, the image as the image target is divided into a first division image data, and a second division image data. In addition, the operation panel management unit 181 displays a first division image which is the first division image of the display target on a display unit of which the display ability (including display resolution) is the best. With this configuration, it is possible to display a division image which is firstly seen by the user 7 on a display unit of which the display ability is the best (display unit which is easiest to see), and to display an image corresponding to image data as the display target largely.

The relative position detection sensor 161 detects a distance from the image forming apparatus 10 to the first and second terminal devices 2 and 3. The relative position detection sensor 161 transmits these detection results to the operation panel management unit 181.

As illustrated in FIG. 3, the first terminal device 2 includes a second control unit 21, a second wireless communication unit 22, a second operation panel 23, a second display unit 231, the inclination sensor 24, and a second storage unit 25.

The second control unit 21 is a CPU, and controls the entire first terminal device 2. The second wireless communication unit 22 performs a communication using, for example, a wireless network which is conformed with IEEE802.11 standard (WiFi network, or WLAN), a wireless communication network which is conformed with IEEE802.16 standard (for example, Wimax 802.16e, or Wibro) through the wireless LAN access point 6.

The second operation panel 23 obtains information on a touch movement, and a touch point of the user 7 which is detected in the second display unit 231, and transmits the information to the second storage unit 25. The inclination sensor 24 detects an inclination of the terminal device with respect to the ground surface, and transmits the detected information to the second storage unit 25. The second storage unit 25 is connected to the second control unit 21, the second operation panel 23, the second wireless communication unit 22, and the inclination sensor 24, and is a memory, an HDD (Hard Disk Drive), or the like. Information on a display resolution, an operation detection method, and the presence or absence of the inclination sensor 24 of the second display unit 231, and an identification number of the second terminal device 3 itself are recorded in advance in the second storage unit 25. In addition, pieces of information on a touch movement, and a touch point which are obtained from the second operation panel 23, and information on a relative position to the image forming apparatus 10 which is transmitted from the second control unit 21 are recorded in the second storage unit 25. In addition, a second display ability is pieces of information on a display resolution and an operation detection method of the second display unit 231 which are recorded in the second storage unit 25 in advance, and the presence or absence of the inclination sensor 24, and information on the touch movement, and the touch point.

As illustrated in FIG. 3, the second terminal device 3 includes a third control unit 31, a third wireless communication unit 32, a third operation panel 33, a third display unit 331, and a third storage unit 34. Since the second terminal device 3 has the same configuration as that of the first terminal device 2, excepting for not having the inclination sensor 24, descriptions thereof will be omitted.

Figure 4:
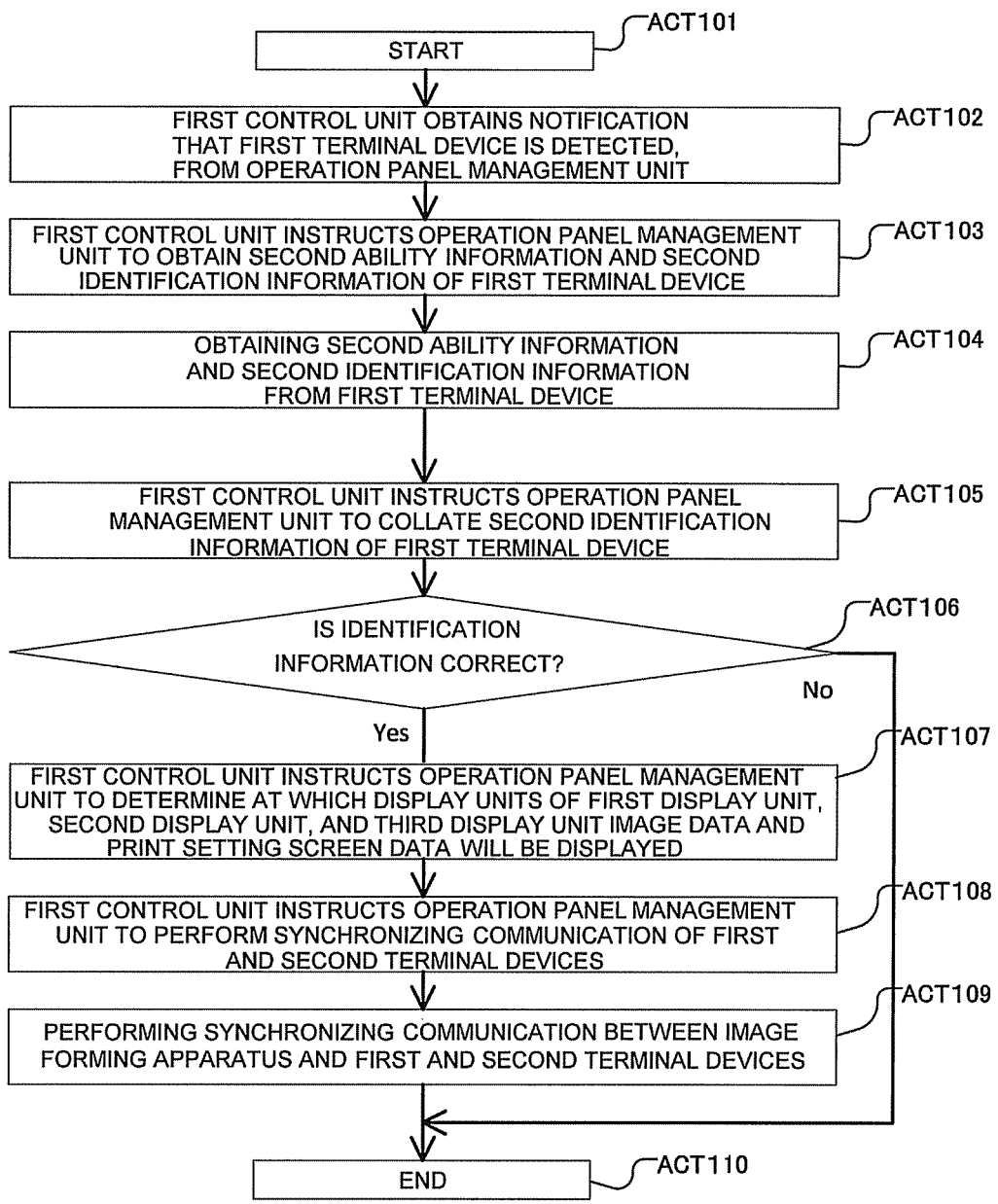
FIG. 4 is a flowchart for controlling synchronizing communication between the image forming apparatus and a terminal device.
Figure 7:
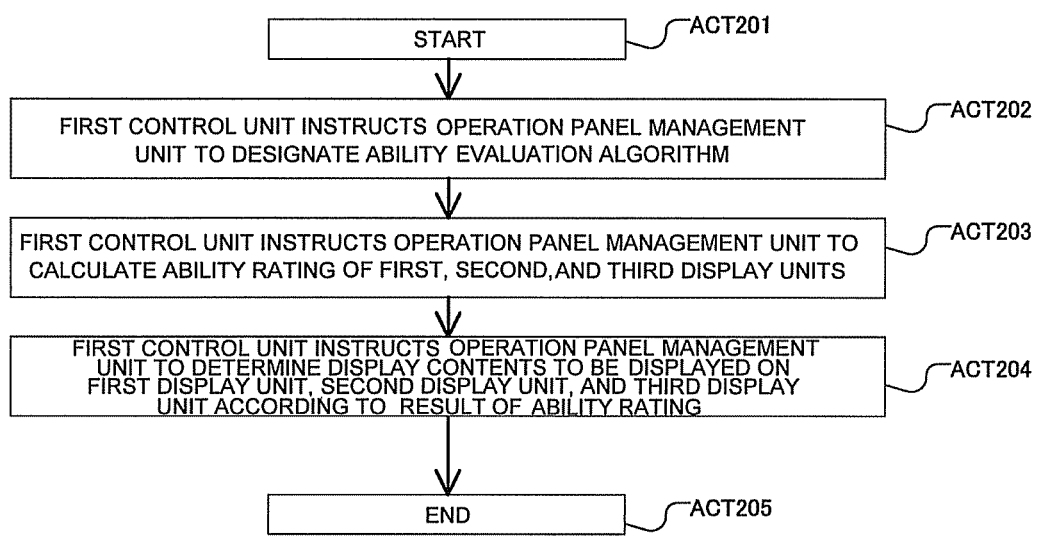
FIG. 7 is a flowchart for controlling a display process of divided images in the operation panel management unit.
Figure 8:
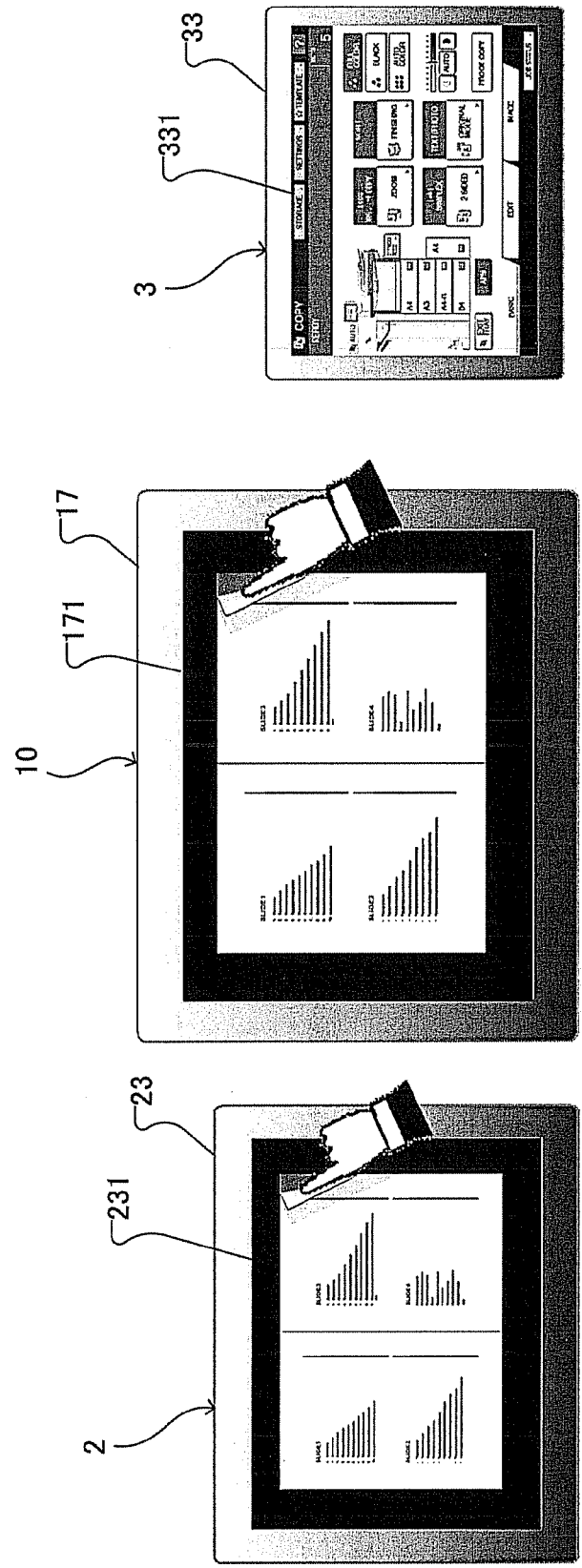
FIG. 8 is a diagram in which is displayed images corresponding to image data, and a print setting screen on respective display units, in the image processing system.
Figure 9:
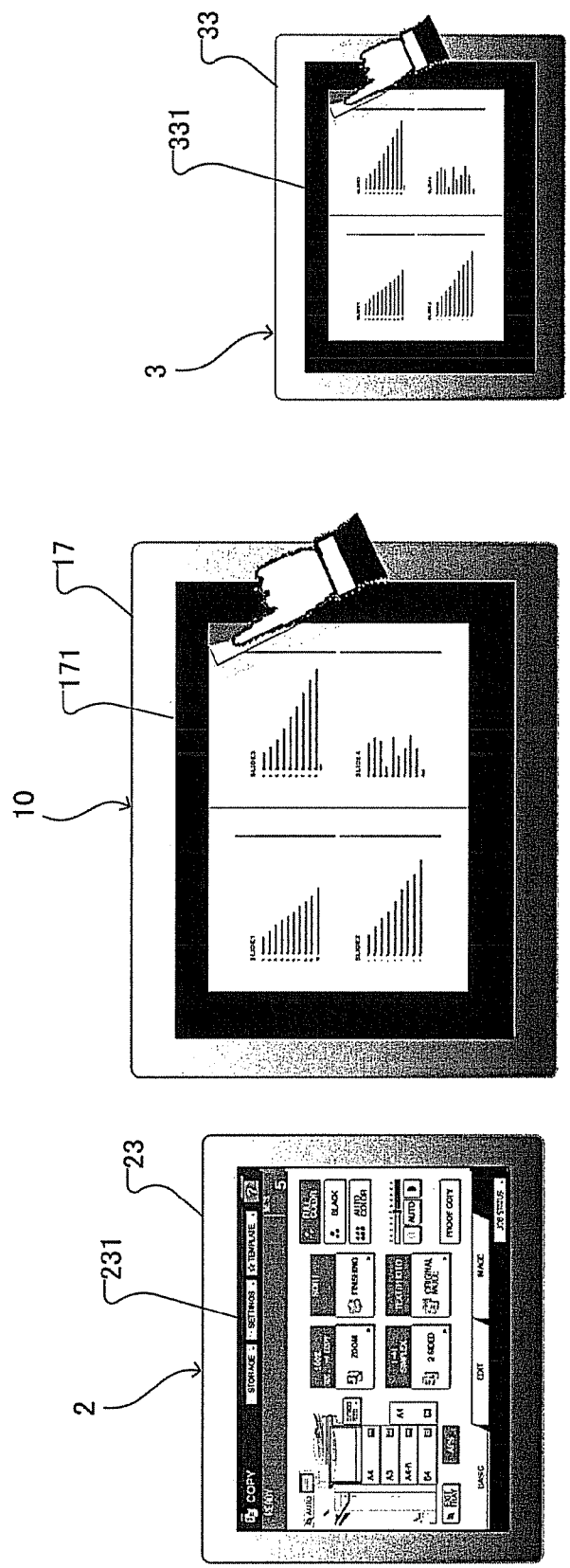
FIG. 9 is a diagram which displays the image corresponding to the image data, and the print setting screen, in the image processing system when weighting factors are changed.
Figure 10:
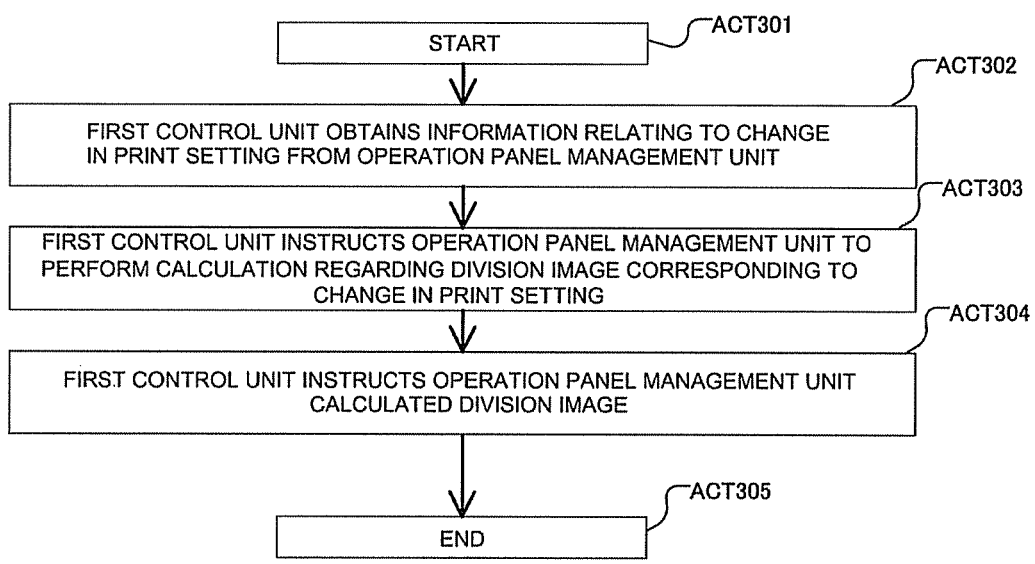
FIG. 10 is a flowchart for controlling a change in the print setting, after starting the synchronizing communication in the image processing system.

Subsequently, a display method relating to the image processing system 1 according to the embodiment will be described. FIG. 4 is a flowchart for controlling a synchronizing communication between the image forming apparatus 10 and the terminal device. FIG. 5 is a diagram which illustrates ability information of a plurality of display units which are managed by the operation panel management unit 181. FIG. 6 is a diagram which illustrates a total rating of the image forming apparatus 10, and the terminal device which is performing the synchronizing communication. FIG. 7 is a flowchart for controlling display processing of divided images in the operation panel management unit 181. FIG. 8 is a diagram in which an image corresponding to image data, and a print setting screen are displayed on each display unit in the image processing system 1. FIG. 9 is a diagram in which an image corresponding to image data, and a print setting screen are displayed in the image processing system 1 when a weighting factor is changed. FIG. 10 is a flowchart for controlling a change in print setting after starting the synchronizing communication in the image processing system 1.

First, an operation of synchronizing communication between the image forming apparatus 10 and the first and second terminal devices 2 and 3 will be described using FIG. 4. As the initial state, the image forming apparatus 10 has first identification information of 0001, has the first display unit 171 which is the resistance film type, and of which the display resolution is 800×600 dpi, and does not have the inclination sensor 24. The first terminal device 2 has second identification information of 0002, has the second display unit 231 which is the capacitive type, and of which the display resolution is 1024×768 dpi, and has the inclination sensor 24. In addition, the second terminal device has the third identification information of 0003, has the third display unit 331 which is the resistance film type, and of which the display resolution is 800×400 dpi, and does not have the inclination sensor 24. The first ability information relating to the image forming apparatus 10, the second ability information relating to the first terminal device 2, and the third ability information relating to the second terminal device 3 are respectively stored in the first storage unit 19, the second storage unit 25, and the third storage unit 34. In addition, the second terminal device 3 is placed on the upper part of the image forming apparatus 10.

Referring to FIG. 4, when the user 7 approaches the image forming apparatus 10, and the first terminal device 2 enters a communication range of the first wireless communication unit 183, the first control unit 18 is informed that the first terminal device 2 is detected from the first wireless communication unit 183 (ACTs 101 and 102). The first control unit 18 instructs the operation panel management unit 181 to obtain the second ability information, and the second identification information relating to the second terminal device 3 (ACT 103). The operation panel management unit 181 obtains the second ability information including the capacitive type, the display resolution of 1024×768 dpi, and the inclination sensor 24 which is present which is stored in the second storage unit 25 in the first terminal device 2, and the second identification information of 0002. In addition, the operation panel management unit 181 also obtains the second ability information relating to a relative position to the image forming apparatus 10 of the first terminal device 2 which is detected in the relative position detection sensor 161 (ACT 104).

When it is determined that the first control unit 18 obtains the second ability information and the second identification information relating to the first terminal device 2 by the operation panel management unit 181, the first control unit 18 instructs the operation panel management unit 181 to collate the second identification information (ACT 105). The operation panel management unit 181 determines whether or not the obtained second identification information matches the identification information which is stored in the first storage unit 19, and can perform a communication (ACT 106).

Similarly, the first control unit 18 obtains the third ability information and the third identification information relating to the second terminal device 3 with respect to the second terminal device 3 which is in a communication range of the first wireless communication unit 183. In addition, the operation panel management unit 181 obtains the third ability information which is recorded in the third storage unit 34 in the second terminal device 3, includes the resistance film type, the display resolution of 800×400 dpi, and does not include the inclination sensor 24, and the third identification information of 0003. In addition, the operation panel management unit 181 also obtains the third ability information relating to the relative position to the image forming apparatus 10 of the second terminal device 3 which is detected in the relative position detection sensor 161. In addition, the operation panel management unit 181 determines whether or not the obtained third identification information matches the identification information which is stored in the third storage unit 34, and can perform a communication.

When the operation panel management unit 181 determines that the obtained the second identification information 0002, and the third identification information 0003 match the identification information which is stored in the first storage unit 19, the first control unit 18 outputs an instruction on display arrangement determining on which display unit of the first display unit 171, the second display unit 231, and the third display unit 331, the image data as a display target, and the print setting screen data will be displayed to the operation panel management unit 181 (YES in ACT 106, and ACT 107). In addition, as described later, the operation panel management unit 181 determines any one of the first display unit 171, the second display unit 231, and the third display unit 331 as the display unit on which the image data as the display target, and the print setting screen data are displayed.

In addition, similarly to these processes, a printed sheet on which the image which is placed on the automatic document feeding unit 16 by the user 7 is read out in the image reading unit 15. The read image data (image data as target) is stored in the first storage unit 19 by the first control unit 18.

The first control unit 18 instructs the operation panel management unit 181 to cause the first terminal device 2 and the second terminal device 3 to perform the synchronizing communication (ACT 108). The first control unit 18 causes the first wireless communication unit 183 to operate, and performs the synchronizing communication between the image forming apparatus 10 and the first and second terminal devices 2 and 3 (ACT 109). In addition, the operation panel management unit 181 transmits the image data as the display target, and the print setting screen data to the first display unit 171, the second display unit 231, and the third display unit 331 based on the determination on displaying.

Subsequently, a method of determining displaying in the operation panel management unit 181 will be described using FIGS. 5, 6, and 7.

When referring to FIG. 7, when the operation panel management unit 181 receives the display arrangement instruction from the first control unit 18 (ACT 107 in FIG. 4), the first control unit 18 instructs the operation panel management unit 181 to urge the user 7 to designate an ability evaluation algorithm (ability evaluation calculation method of changing values of weighting factor) (ACTS 201 and 202). The operation panel management unit 181 prompts the user 7 to set a weighting factor relating to each item of the display resolution, the operation detection method, the relative position to the image forming apparatus 10, and the presence or absence of the inclination sensor 24 which configure the display ability. Here, since the user 7 regards the visibility as the most important, and the operability as the second important, it is assumed that the user 7 sets the weighting factor relating to display resolution: operation detection method: relative position to image forming apparatus 10: presence or absence of inclination sensor 24 to 3:2:1:1.

The first control unit 18 instructs the operation panel management unit 181 to calculate the ability rating relating to the first display unit 171, the second display unit 231, and the third display unit 331 (ACT 203). The operation panel management unit 181 determines ranking of the first display unit 171, the second display unit 231, and the third display unit 331 relating to the display resolution, the operation detection method, the relative position to the image forming apparatus 10, and the presence or absence of the inclination sensor 24 which configure the display ability. Specifically, for the display resolution, a high display resolution gets a high rating in order, for the operation detection method, the capacitive type gets rating 1, and the resistance film type gets rating 2, for the relative position to the image forming apparatus 10, the close position to the image forming apparatus 10 gets a high rating in order, and for the presence or absence of the inclination sensor 24, when the inclination sensor 24 is present, it gets rating 1, when the inclination sensor 24 is not present, it gets rating 2. In this manner, as illustrated in FIG. 6, each display ability in FIG. 5 relating to the image forming apparatus 10, the first terminal device 2, and the second terminal device 3 gets a rating. By multiplying the rating which are received in this manner by the weighting factor as follows, the total rating of the first display unit 171, the second display unit 231, and the third display unit 331 are calculated. In addition, the lower the total rating, the higher the display ability of the display unit.

Regarding the first display unit 171 of the image forming apparatus 10;

$$3\times2+2\times2+1+2=13$$

Regarding the second display unit 231 in the first terminal device 2;

$$3\times1+2\times1+3+1=9$$

Regarding the third display unit 331 in the second terminal device 3;

$$3\times3+2\times2+2+2=17$$

As denoted in the calculation result in FIG. 6, the operation panel management unit 181 determines that the display ability of the display units are excellent in order of the second display unit 231, the first display unit 171, and the third display unit 331.

The first control unit 18 instructs the operation panel management unit 181 to determine display contents to be displayed on the first display unit 171, the second display unit 231, and the third display unit 331 according to the result of the ability rating (comparison result) which is calculated in the operation panel management unit 181 (ACT 204). As illustrated in FIG. 8, the operation panel management unit 181 allocates the display of the print setting screen in which print setting relating to image data as a display target is performed to the third display unit 331 with the highest total rating, and allocates displaying of an image corresponding to image data as a display target to the other display units of the first display unit 171 and the second display unit 231. In addition, the operation panel management unit 181 allocates a division display of the first image data (for example, first and second pages) (first division image data) relating to the image data as the display target to the second display unit 231 with the lowest total rating, as denoted in FIG. 8, and allocates a division display of the subsequent image data (for example, third and fourth pages) (second division image data) to the first display unit 171. The first control unit 18 transmits division image data, and print setting screen data relating to the image data as the display target to the first display unit 171, the second display unit 231, and the third display unit 331 by causing the first wireless communication unit 183 to operate using the operation panel management unit 181. The display determination process by the operation panel management unit 181 is completed by displaying the division image corresponding to the division image data which is transmitted to the respective first display unit 171, the second display unit 231, and the third display unit 331, and the print setting screen corresponding to the print setting screen data as in FIG. 8 (ACT 205).

In the image forming apparatus 10 according to the embodiment, by configuring such that a print setting screen which does not need a high display resolution is displayed on a display unit with the lowest display resolution among three display units of the image forming apparatus 10, and the first and second terminal devices 2 and 3 which simultaneously communicate with the image forming apparatus, it is possible to display the image data as the display target which needs a high display resolution on a display unit with a high display resolution. That is, the image forming apparatus 10 according to the embodiment can display the image, and the print setting screen corresponding to the image data as the display target on each display unit in consideration of the display ability of the display unit (including display resolution).

In addition, in the image forming apparatus 10 according to the embodiment, the user 7 is able to confirm content by displaying the image data on the display unit with the best display ability, by displaying the division image which is formed by dividing the image data as the display target on a display unit with the best display ability, in order. In addition, since the image data as the display target is displayed on the first display unit 171 and the second display unit 231 by being divided, it is possible to confirm the image data in a state of being largely displayed.

In addition, in the image forming apparatus 10 according to the embodiment, since it is possible to change the rating relating to each display ability by changing the weighting factor, it is possible to evaluate the total rating with respect to the display unit corresponding to a use of the user 7. That is, in the above described embodiment, since the user 7 considers the visibility most important, and the operability second important, and sets the weighting factors relating to display resolution: operation detection method: relative position to image forming apparatus 10: presence or absence of inclination sensor 24 to 3:2:1:1, however, when the user 7 considers a reflection of a display image due to the inclination of the display unit most important, and a distance to the image forming apparatus 10 second important, the user 7 sets the weighting factors relating to display resolution: operation detection method: relative position to image forming apparatus 10: presence or absence of inclination sensor 24 to 1:1:2:3. In this manner, regarding a display unit on which the image data as the display target is displayed, a display unit which is close to the image forming apparatus 10 is priorly displayed due to the presence of the inclination sensor 24. That is, as illustrated in FIG. 9, it is possible to display the image data as the display target on each display unit from the terminal device which is closed to the image forming apparatus 10 in order. More specifically, the operation panel management unit 181 allocates a display of image data relating to the first and second pages to the display unit of the image forming apparatus 10, and allocates a display of image data relating to the third and fourth pages to the display unit of the terminal device which is close to the image forming apparatus 10. In this manner, it is possible to confirm the image data as the display target by largely displaying, in a state of making the operation in the image forming apparatus 10 easy.

Subsequently, a changing process when the print setting is changed on the print setting screen, when the image forming apparatus 10, the first terminal device 2, and the third terminal device 3 are performing the synchronizing communication will be described.

When referring to FIG. 10, as described above, when the user 7 set a change in the print setting (for example, changing from horizontally opened binding to vertically opened biding) on the print setting screen which is displayed on the third display unit 331 which is determined as a display unit with the lowest display ability by the operation panel management unit 181, the first control unit 18 obtains information on the change in the print setting through the first wireless communication unit 183 (ACTS 301 and 302). The first control unit 18 instructs the operation panel management unit 181 to calculate so that the division image which is displayed and output on the first display unit 171, and the second display unit 231 through the first wireless communication unit 183 is displayed by corresponding to the change in the print setting by the user 7 (ACT 303). The first control unit 18 instructs the operation panel management unit 181 of the division image corresponding to the change in the print setting which is calculated by the operation panel management unit 181 (ACT 304). In addition, the operation panel management unit 181 causes the first display unit 171 and the second display unit 231 to display the changed division image through the first wireless communication unit 183 (ACT 305).

With this configuration, it is possible to reflect the content which is changed on the print setting screen by the user 7 in the division image which is displayed by dividing the image data as the display target.

Figure 11:
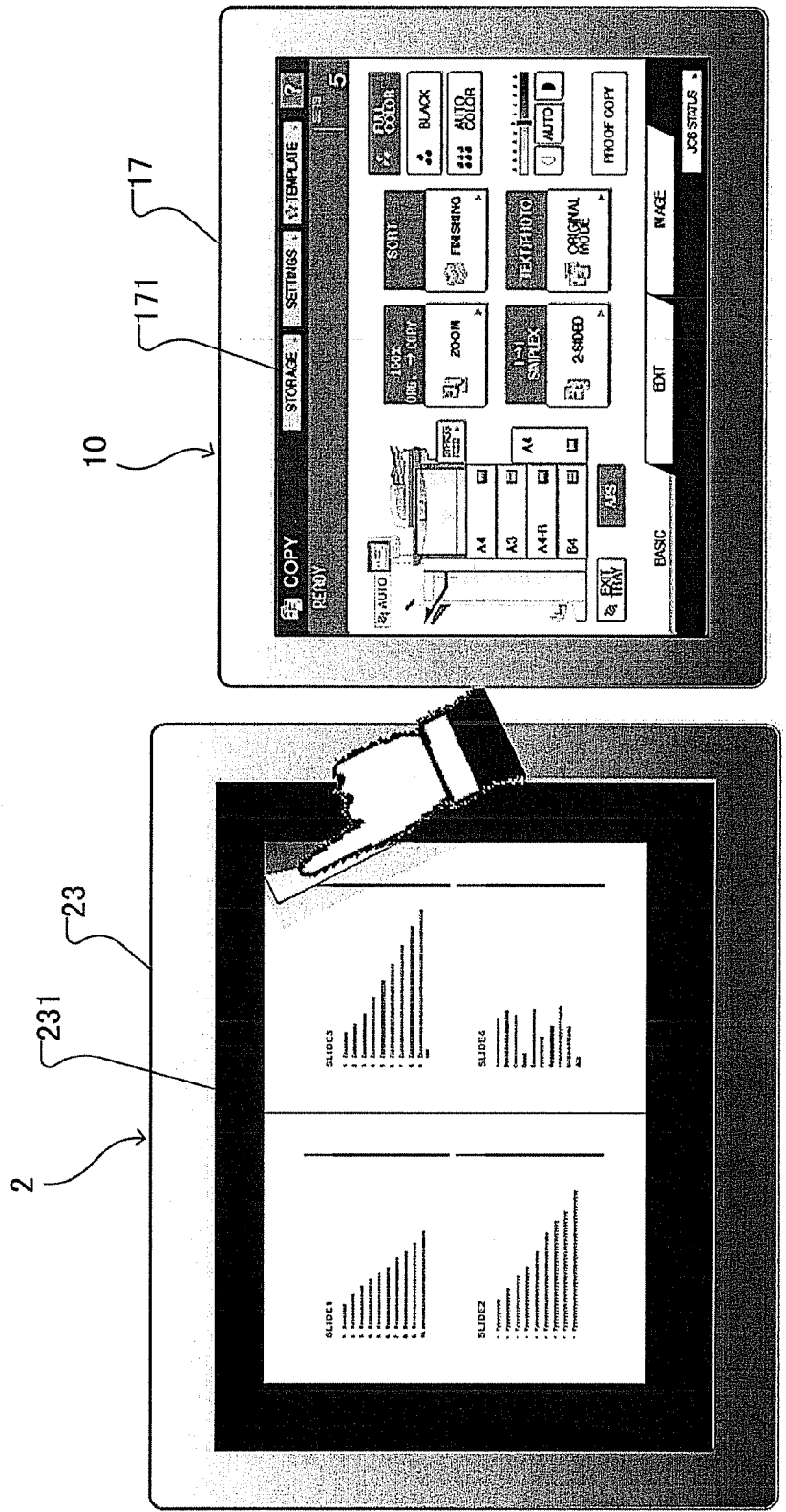
FIG. 11 is a schematic diagram in which an image and a print setting screen corresponding to image data in the image forming apparatus and a first terminal device are displayed.

According to the above described embodiment, the image processing system 1 is described as a system including the image forming apparatus 10, the first terminal device 2, and the second terminal device 3, however, the image processing system is not particularly limited to this, and may include the image forming apparatus 10, and the first terminal device 2. Even in this case, the operation panel management unit 181 obtains information relating to the display ability of the first terminal device 2, and performs comparison processing of the above described display ability. Specifically, when the operation panel management unit 181 determines that the display ability of the second display unit 231 is superior to that of the first display unit 171, as illustrated in FIG. 11, the first control unit 18 displays an image corresponding to the image data as the display target on the second display unit 231 (transmits image data as target to second display unit 231), and displays the print setting screen (print setting screen data) relating to print setting in the image data as the display target on the first display unit 171 (transmits print setting screen data to first display unit 171).

Figure 12:
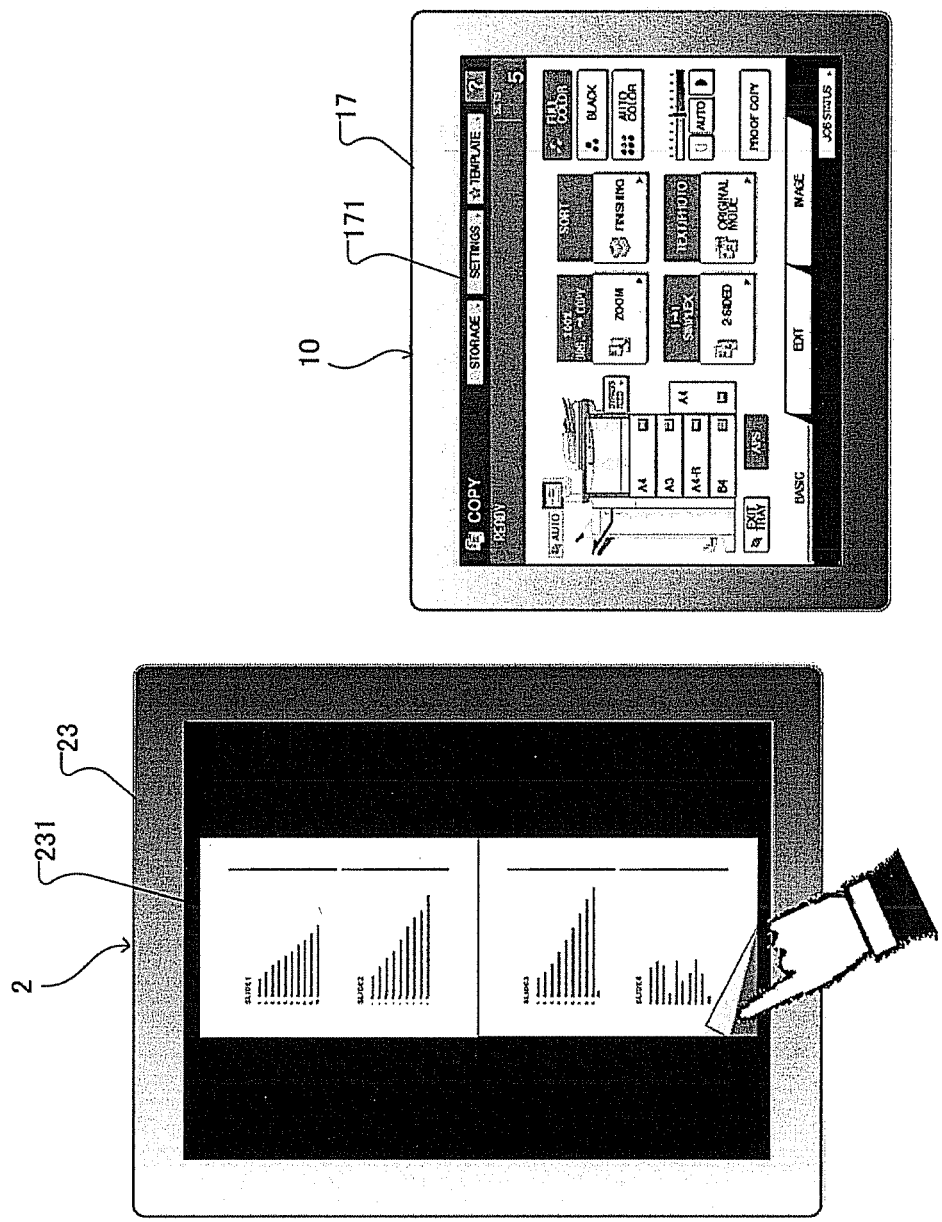
FIG. 12 is a schematic diagram in which an image and the print setting screen corresponding to image data when the first terminal device is vertically changed are displayed.

In addition, when the user 7 changes the horizontally opened binding to the vertically opened binding in the first terminal device 2, the inclination sensor 24 transmits an inclination change display signal in which a display screen of the first terminal device 2 is changed to the vertical direction from the horizontal direction to the first control unit 18. When the first control unit 18 receives the inclination change display signal through the first wireless communication unit 183, the first control unit 18 performs a calculation of the image data as the display target (performs calculation of image data so that display screen is changed to vertical direction from horizontal direction) so that it becomes display content corresponding to the change display signal with respect to the operation panel management unit 181. The first control unit 18 transmits the image data which is calculated by the operation panel management unit 181 (vertical image data) to the first terminal device 2, and changes the display content in the second display unit 231 of the first terminal device 2, and the first display unit 171 of the image forming apparatus 10, as illustrated in FIG. 12.

With this configuration, it is possible to display the image data as the display target on a display unit using a format which is the easiest to see for the user 7 considering the inclination of the first terminal device 2.

In addition, as described above, when assuming that the image processing system 1 includes the image forming apparatus 10 and the first terminal device 2, it is described that the second display unit 231 is caused to display an image corresponding to the image data as the display target, and the first display unit 171 is caused to display the print setting screen relating to print setting in the image data as the display target, however, it is not particularly limited to this. It is also possible to divide the image corresponding to the image data as the display target, and to display the divided image on the first display unit 171, and the second display unit 231. Specifically, when the operation panel management unit 181 determines that the second ability information is superior to the first ability information, the operation panel management unit 181 has a configuration in which the image data as the display target is divided, first division image data and second division image data are generated, the first division image data is allocated to the second display unit 231, and the second division image data is allocated to the first display unit 171. In addition, the first control unit 18 transmits the first division image data and the second division image data to the first display unit 171 and the second display unit 231, respectively, according to the allocation result of the operation panel management unit 181.

With this configuration, it is possible for the user 7 to understand the content of the image data easily by dividing the image data as the display target, and displaying on the first display unit 171 and the second display unit 231.

In addition, in the above described embodiment, a case where a terminal device which performs the synchronizing communication with the image forming apparatus 10 is only one device of the first terminal device 2, and a case where the devices are only two of the first terminal device 2, and the second terminal device 3 were described, however, it is not particularly limited to this, and the terminal device which performs the synchronizing communication with the image forming apparatus 10 may be three or more.

In addition, in the above described embodiment, regarding the display abilities of the first display unit 171, the second display unit 231, and the third display unit 331, the display abilities are described as pieces of information on the display resolution, the operation detection method, the relative position to the image forming apparatus 10, and the presence or absence of the inclination sensor 24 relating to the first display unit 171, the second display unit 231, and the third display unit 331, however, it is not particularly limited to this, and it may be at least any one of the information on the display resolution, the operation detection method, the relative position to the image forming apparatus 10, and the presence or absence of the inclination sensor 24 relating to the first display unit 171, the second display unit 231, and the third display unit 331.

Further, in the above described embodiment, the image data as the display target is described as image data which is read out in the image reading unit 15, however, it is not particularly limited to this, and may be display data to be displayed on the display unit. For example, the display data may be data relating to an order of returning operation regarding an error when paper jam occurs in the image forming apparatus 10, or data relating to a position in which the paper jam occurred. That is, it is also possible to have a configuration in which the display unit which is determined as a unit having an excellent display ability by the operation panel management unit 181 is caused to display image data relating to the order of returning operation, or the like (data relating to guidance to cope with errors), and the other display unit is caused to display at which position of the image forming apparatus 10, the paper jam occurred (target data of error state), by comparing the display ability of the first display unit 171 of the image forming apparatus 10, and the second display unit 231 of the first terminal device 2. With this configuration, it is possible for the user 7 to confirm at which position of the image forming apparatus 10 the paper jam occurred, and how the paper jam can be handled, on a screen which is the easiest to see. In this case, the image data to be displayed, or the guidance for handling may be displayed using a video. In addition, the first display unit 171, and the second display unit 231 may be used in a predetermined image forming operation, the guidance for handling of the operation order, or the like.

According to the embodiment, a case in which functions for executing the exemplary embodiment is recorded in advance in the apparatus was described, however it is not limited to this. The same function may be downloaded to the device from the network 4, or the same function which is stored in a recording medium may be installed to a device. As the recording medium, any type is possible, if it is a recording medium which is able to store programs such as a CD-ROM, and can be read out by the device. In addition, the functions which can be obtained through installing, or downloading in advance in this manner may be functions which can be executed in cooperation with an OS (Operating System) in the device.

As described above, according to the technology which is disclosed in the specification, it is possible to improve a display performance of displaying image data on a plurality of display units.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:
1. An image forming apparatus comprising:
a first display which displays display data;
a memory which stores first ability information relating to a display ability of the first display unit;

a communication interface which is provided at a first different terminal device from the image forming apparatus, obtains second ability information relating to a second display which displays display data; and a controller which compares the obtained second ability information to the first ability information, determines whether to display display data as a display target on the first display, or on the second display unit according to a comparison result of the ability information.

2. The image forming apparatus according to claim 1, wherein the first ability information and the second ability information are resolution.

3. The image forming apparatus according to claim 2, wherein causing one display which of high resolution of the first capability information and the second capability information to display an image, and causing other display to display a printing setting image.

4. The image forming apparatus according to claim 1, wherein the communication interface obtains a third ability information relating to a third display which displays display data from a second terminal device which having the third display differed from the first display, and the controller evaluates the first to third ability information together.

5. The image forming apparatus according to claim 4, wherein the first to third ability information are resolution.

6. The image forming apparatus according to claim 5, wherein the controller causes the display of the lowest resolution among the first to third displays to display a print setting image.

7. The image forming apparatus according to claim 6, wherein the controller causes the display other than the display which caused to display the print setting image, to display image of image data.

8. The image forming apparatus according to claim 7, wherein the controller causes the display of the highest resolution to display the first page of image data.

9. The image forming apparatus according to claim 1, wherein the ability information is of multiple items, and the controller evaluates by adding a weight to each item.

10. The image forming apparatus according to claim 1, wherein the ability information is of multiple items, and the controller determines the item of the ability information by a selected instruction of user.

11. The image forming apparatus according to claim 1, wherein the first terminal device is a tablet.

12. An image processing method of an image forming apparatus comprising:

obtaining second ability information relating to a second display which is provided at a first different terminal device from the image forming apparatus and displays display data;

comparing a first ability information from a memory which stores first ability information relating to a display ability of the first display which displays display data to the second ability information; and determining whether to display display data as a display target on the first display, or on the second display according to a comparison result of the ability information.

13. The image processing method of an image forming apparatus according to claim 12, wherein obtaining a third ability information relating to a third display which displays display data from a second terminal device which having the third display differed from the first display, and evaluating the first to third ability information together.

14. The image processing method of an image forming apparatus according to claim 13, wherein the first to third ability information are resolution.

15. The image processing method of an image forming apparatus according to claim 14, wherein causing the display of the lowest resolution among the first to third displays to display a print setting image.

16. The image processing method of an image forming apparatus according to claim 15, wherein causing the display of the highest resolution to display the first page of image data.

* * * * *